2,079,750

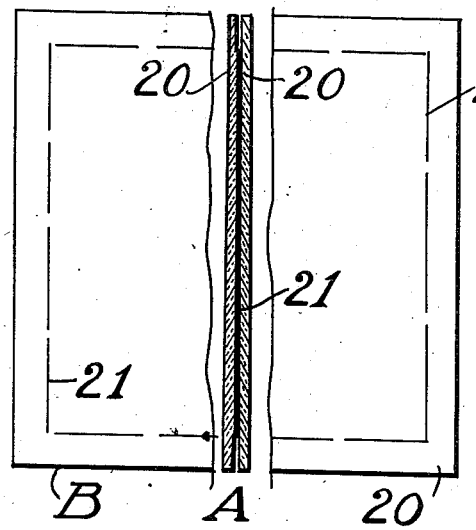
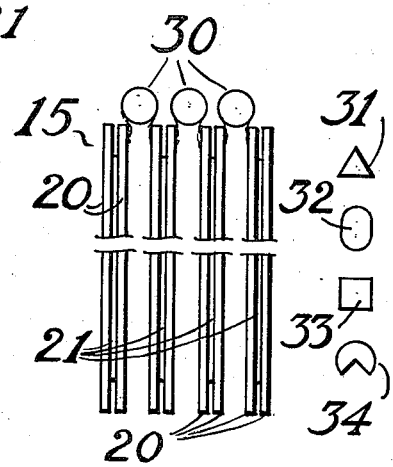
Fig.-2   Fig.-3   Fig.-4
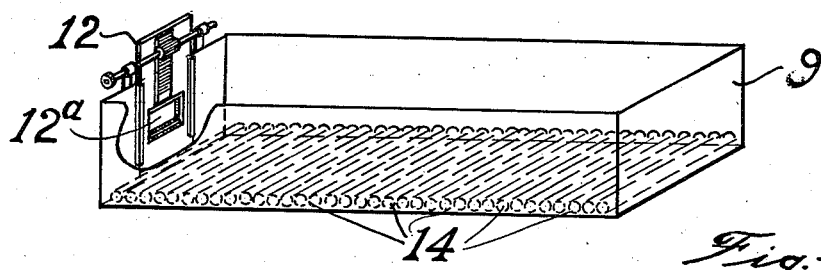
Fig.-5
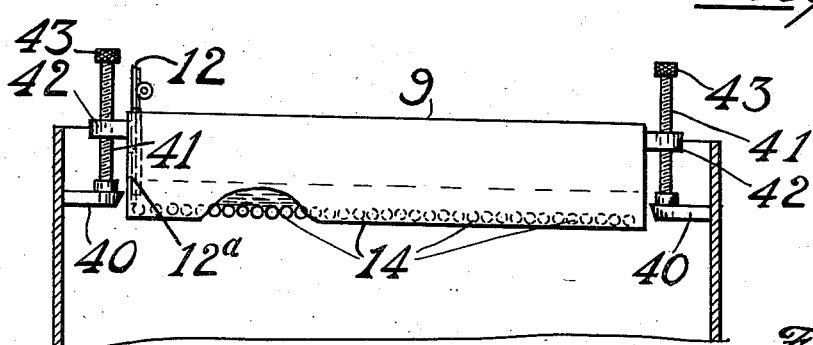
Fig.-6
William J. Sweeney
Roger W. Richardson  Inventors
Eger V. Murphree
By P. L. Young  Attorney May 11, 1937. W. J. SWEENEY ET AL 2,079,750
APPARATUS FOR VOLTOLIZATION
Filed May 14, 1935 3 Sheets-Sheet 3
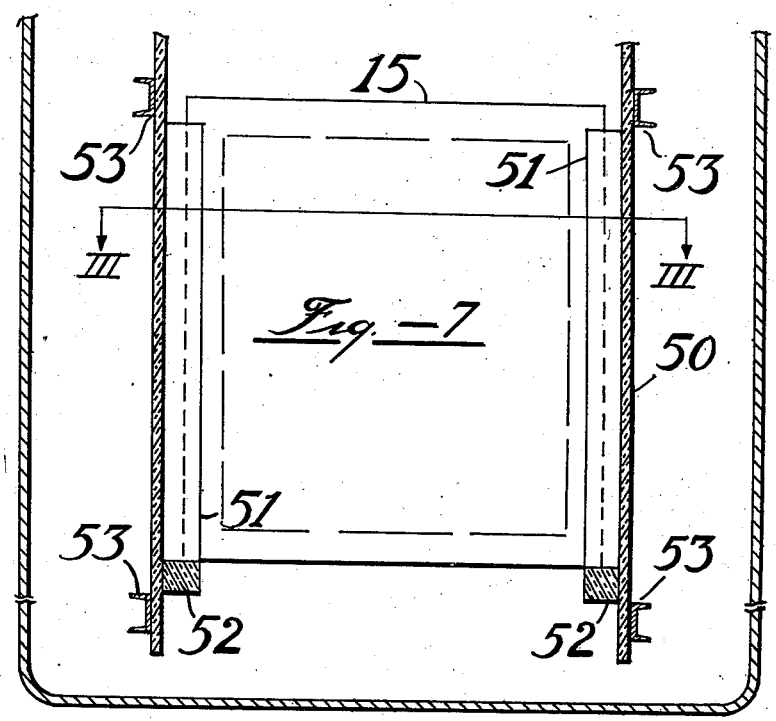
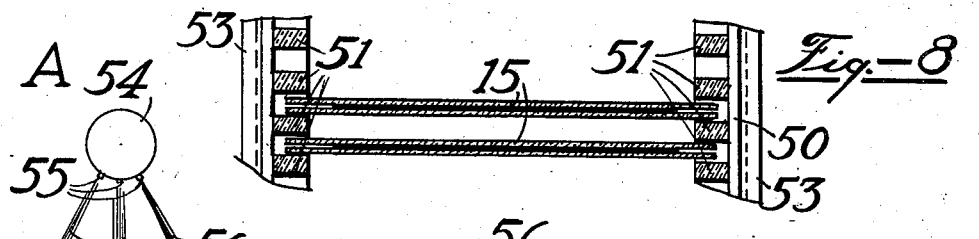
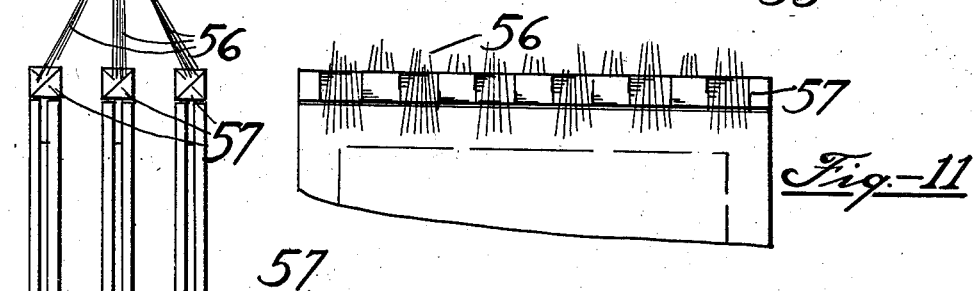
William J. Sweeney
Roger W. Richardson Inventors
Eger V. Murphree
By P. L. Young Attorney Patented May 11, 1937

UNITED STATES PATENT OFFICE 2,079,750

APPARATUS FOR VOLTOLIZATION

William J. Sweeney and Roger W. Richardson, Baton Rouge, La., and Eger V. Murphree, New York, N. Y., assignors to Standard Oil Development Company, a corporation of Delaware Application May 14, 1935, Serial No. 21,434

6 Claims. (Cl. 204—31)

This invention relates to apparatus for subjecting hydrocarbon material to the action of silent electric discharges and is more particularly concerned with certain improvements therein.

The treatment of material with silent electric discharges is frequently called voltolization. It consists essentially in passing a high tension high frequency alternating current through a thin film of the material to be treated while the same is maintained under vacuum or in a rarefied gaseous atmosphere. The discharges occur between electrodes on or around which the material is caused to flow and because the apparatus is maintained under vacuum the discharges or sparks are silent.

The efficiency and effectiveness of the voltolization is dependent to a great extent upon the amount of surface of the material exposed to the discharges. Thus it is desirable to expose as large a surface as possible. This may be done in a variety of ways, by introducing the material between the electrodes in the form of foam or froth, or by causing a thin film thereof to flow over the surface of the electrodes. The voltolization treatment evolves heat so that it is desirable to provide means for cooling the material being treated. The temperature must be carefully controlled because too much heat has an injurious effect on the products of voltolization, whereas if the temperature is too low certain initial materials such as waxes or highly viscous oils will not readily flow over the electrodes.

The present invention provides improvements in voltolization apparatus, particularly with respect to the method of supporting the electrodes in the apparatus, the method of distributing the material to be treated over the surface of the electrodes, and the method for dissipating the heat evolved by the treatment. The nature of these improvements will be fully understood from the following description read with reference to the accompanying drawings of which Figure 1 is a semi-diagrammatic view in sectional elevation of the entire apparatus;

Figure 2 illustrates in detail the cross-section and elevation of an electrode;

Figure 3 is a detail diagrammatic view of the oil-distributing mechanism;

Figure 4 is a cross-sectional detail of other forms of rods that may be used in the oil-distributing mechanism;

Figure 5 is an enlarged diagrammatic end view of the oil-distributing trough;

Figure 6 is an enlarged view of an alternative form of oil-distributing trough;

Figure 7 is a detail side view of the means for supporting the electrodes; and

Figure 8 is a detail top view taken on the line III—III of Figure 7 of the means for supporting the electrodes;

Figure 9 is a semi-diagrammatic view of an alternative means of distributing the oil on to the electrodes;

Figure 10 is a top view of the alternative means shown in Figure 9; and

Figure 11 is a side view of the alternative means shown in Figure 9.

Figure 1:
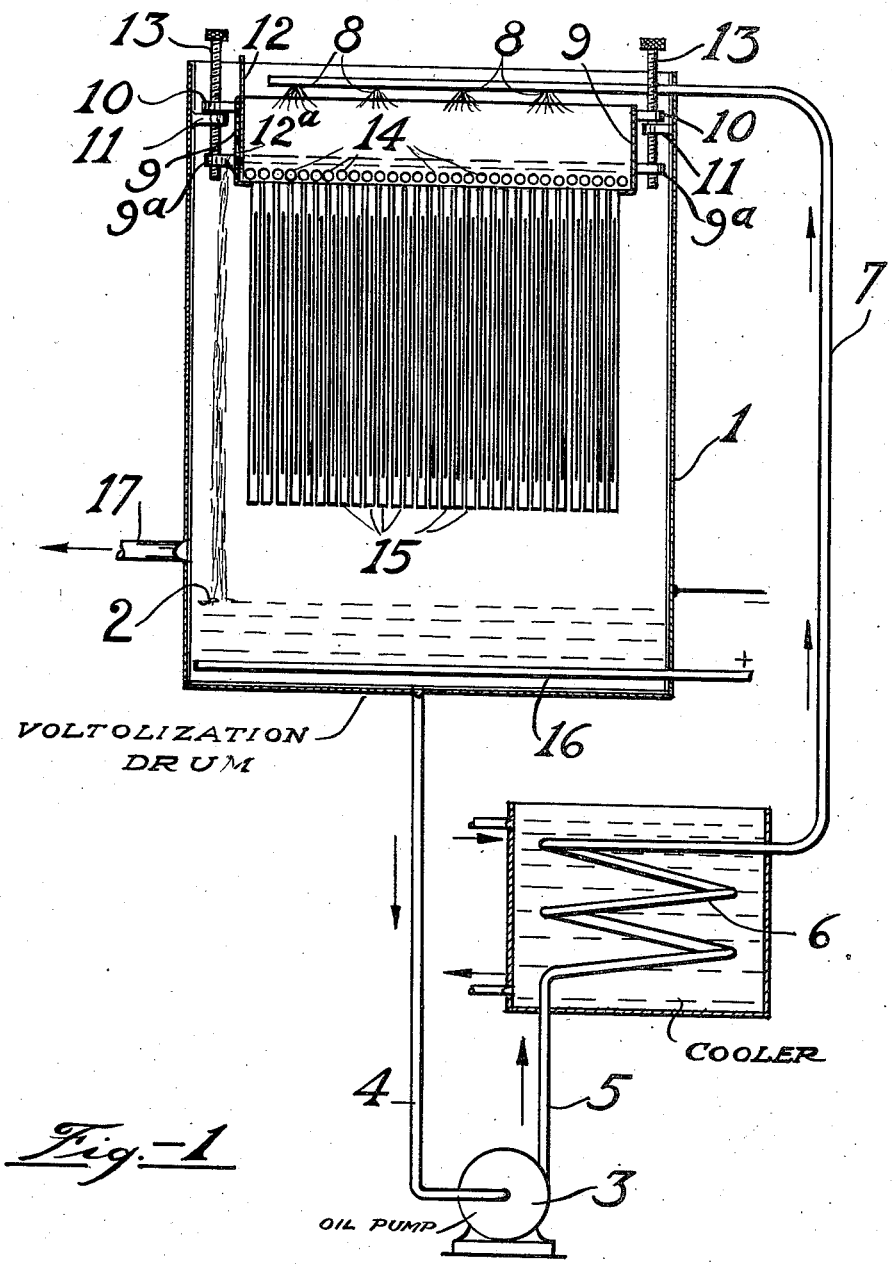

Referring to Figure 1, numeral 1 designates the drum or cylinder in which the voltolization takes place. This drum is preferably cylindrical in shape because it is maintained under vacuum, although it may be of any convenient shape. The drum may be lined inside with glass, enamel or other inert substance to prevent contamination of the material undergoing voltolization. Numeral 2 designates the level of oil supply maintained in drum 1. Numeral 3 designates a positive displacement pump, such as a gear pump, which withdraws oil from drum 1 through line 4 and forces it through line 5 into and through a cooler 6 and thence through line 7 into the drum 1 where it discharges through a series of openings 8 into oil supply trough 9. It will be understood that in starting up the apparatus or in the event that it is desirable to heat the material the cooler 9 may be replaced by a heating means.

Oil supply trough 9 is supported by lugs 10 which bear against shoulders 11 attached to the wall of the drum. A bracket member 9a is engaged by the threaded post 13 and causes the trough 9 to be moved up or down by turning the post 13. The overflow from the trough flows down through the slot in member 12 and through the slot 12a into the bottom of the drum. The level of the oil in trough 9 may be raised or lowered by raising or lowering member 12 thus raising or lowering the weir formed by slot 12a. The bottom of trough 9 has a number of slots conveniently formed by a plurality of rods or bars 14 of such diameter that they just fit into the spaces above and between the electrodes 15. The oil drips down around the rods and flows on to the surfaces of the adjacent juxtaposed electrodes below. In place of rods or bars, the bottom of trough 9 may be provided with slits or shutters so placed as to allow the oil to drip down onto the surfaces of the electrodes below.

The electrodes 15 are supported by means of insulated shoulders on the inside walls of the drum, as will be more fully described below. Even-numbered electrodes are connected to a source of alternating current through a bus bar 16 placed within the drum. Odd-numbered electrodes are grounded. The discharge therefore occurs between each pair of electrodes.

The drum is connected by pipe 17 to a vacuum pump (not shown).

Referring to Figure 2, A represents a transverse section of an electrode. B represents a side elevation of an electrode. In A numerals 20 designate sheets of a dielectric material such as glass. Numeral 21 designates a sheet of metal foil clamped, pressed, cast or glued between the dielectric plates 20. The sheets of dielectric material may be of any convenient thickness but preferably between 1 and 4 millimeters thick and the metal foil of any convenient thickness but preferably between .1 and 1 mm. thick. The assembled electrode may be from 2 to 10 mm. thick.

In B numeral 20 designates the dielectric material and numeral 21 the metal or conductor. The sheets of dielectric material are preferably ¼ to ½ foot wider all around than the sheet of metal foil. The electrode shown is rectangular in shape, but may be of any convenient shape to fit into the containing vessel. The electrodes are preferably spaced from ¼ to ½ inch apart.

The material used as the conducting part of the electrode may be selected from a great variety of metals, metal alloys or other conducting material. In general, any substance that will conduct electricity is suitable. As examples of such substances may be mentioned aluminum, iron, copper, nickel, silver, mercury, platinum, vanadium, tungsten, metal alloys, such as nickel-iron alloys used for contact pieces in electric light bulbs, carbon, graphite, etc. Salts, acids, bases or other electrolytes or solutions thereof may also be used as the conductors, if dielectric materials not attacked by these substances are employed, and if the two sheets of dielectric are sealed at either end to form a liquid-tight pocket in between. The conducting material may be in the form of sheets, foil or mesh screen, or in the form of paste, paint, powder or finely divided particles. It may be sprayed, sputtered or otherwise deposited on the dielectric material. One kind of metal may be electroplated or otherwise coated with another kind of conducting substance. Different metals or conducting substances may be used in each electrode if desired. The sheets of conducting material may be attached to the dielectric material by nonconducting binding material such as resins, glue, etc., or by a conducting material, such as phosphoric acid, water glass, etc.

The dielectric material may also be selected from a great variety of different substances. In general, any material that does not conduct electricity may be used provided it has sufficient strength to withstand high tension currents and can be fabricated and adapted to the construction of the electrodes. As examples of dielectric material may be mentioned glass, wood, paper, porcelain, earthenware, china, clays, wood fibre, compressed paper, rubber, vulcanized rubber, vulcanized fibre, synthetic rubbers such as those known under the trade-marks "Duprene", "Thiokol", "Pliolite", "Plioform", etc., textile materials such as silk, cotton, wool and linen, cork, synthetic and natural resins such as those known under the trade-marks "Bakelite", "Vinylite" and "Pertinax", linoleum, rubber compositions, hydrogenated rubber, drying oils, shellac, polymers of isobutylene, vinyl acetylene, etc., cellulose derivatives such as cellulose acetate and benzyl cellulose, mica, asbestos, leather, sealing wax, hard waxes such as carnauba wax, ivory, amber, lacquers, or combinations or mixtures of any of these materials.

Referring to Figures 3 and 4, numerals 15 designate the electrodes. Numerals 30 designate the rods forming the bottom of the oil supply trough 9. The cross-section of the rods may be circular as shown by 30, or may be as in Figure 4, triangular, oval, square or rectangular or circular with a V-notch as shown by numerals 31, 32, 33 and 34, respectively. The rods, whatever their shape, are preferably so positioned that a sharp edge is close to the surface of the electrode so that oil will flow smoothly from the rod to the electrode. The rods may be made of any suitable, preferably inert, material such as glass, vulcanized rubber, enamelled iron, wood and the like. The rate of flow of the oil on to the surface of the electrodes may be adjusted by changing the height of the rods above the electrodes, thus increasing or decreasing the clearance between the rods and electrodes, and/or by changing the head on the oil supply above in the trough 9 (Fig. 1). The distance between the electrodes may be varied also, but it is preferable in order to facilitate cooling to space the electrodes about ¼ inch or more apart.

Referring to Figure 5 which illustrates diagrammatically the oil trough above the electrodes, numeral 9 designates the trough, numerals 14 designate the rods forming the bottom thereof and numeral 12 designates the sliding slotted piece with slot 12a by means of which the level of oil in the trough may be raised or lowered. The rate of flow of oil on to the electrodes is varied by changing the head of oil above the rods.

Referring to Figure 6 which illustrates a method of adjusting the position of the rods above the electrodes, numeral 9 designates the oil trough, numerals 14 the rods forming the bottom thereof, numerals 40 shoulders fixed to the inside of the drum wall and numerals 41 threaded posts bearing against the shoulders 40. The trough is supported by lugs 42 which engage the threaded posts 41. The trough may be raised or lowered by turning the knobs 43 on the outside of the drum.

Referring to Figure 7 which illustrates in side elevation the method of supporting the electrodes within the drum, numeral 15 designates an electrode, numerals 50 designate vertical insulating material supported from the walls of the drum and numerals 51 designate vertical strips or spacers of insulating material attached to the insulating walls 50. Numerals 52 designate horizontal strips of insulating material on which the electrode rests attached to the vertical insulating walls (50). Numerals 53 designate supporting members attached to the walls of the cylindrical drum and to which are attached the insulating walls 50.

Referring to Figure 8 which is a top view of the electrodes and supporting strips, numerals 15 designate the electrodes, numeral 51 the vertical strips of insulating material and numerals 50 the walls of insulating material.

Referring to Figures 9, 10 and 11, A illustrates an alternative method of oil distribution, numeral 54 designates pipes through which the oil is pumped as it is circulated. The pipes 54 are above and parallel to the electrodes 15, and are provided with orifices 55 spaced every ½ inch along the length of the pipes through which the streams of oil 56 are directed on to the top of the electrodes which are provided with distributors 57. Figures 10 and 11 illustrate top and side views of one of the distributors 57 which are so arranged that each alternate half inch of length slopes in opposite directions as indicated by the arrows. In this way half of the oil coming to any one electrode is directed down one face of the electrode, and the remaining half is directed down the opposite face.

With this arrangement the quantity of oil flowing down the electrode plates is controlled by means of the oil circulating pump. This form of oil distribution is somewhat more simple than that previously described in that the oil containing trough or reservoir above the electrodes is eliminated and replaced by a series of perforated distributing pipes.

The above described apparatus is not limited to the voltolization of any particular type of material nor is it limited to any particular voltage, frequency or vacuum but is adapted to the voltolization of any liquid material under any conditions.

The method of supporting the electrodes so that they are stationary is of great advantage, because this avoids having a rotating shaft carrying electrodes as is necessary in the usual trommel type of voltolizer. The method of distributing the oil over the surface of the electrodes is also of advantage in that it provides a flexible and wide range of rate of flow.

The spacing of the electrodes ¼" or more apart is of particular importance in that temperature control is greatly facilitated. By doing so the greater part of the voltage drop between the electrodes occurs across the gap between them and only a relatively small drop occurs across the dielectric. The relatively large gap between the electrodes also allows a rapid flow of oil between them.

This invention is not limited by any theories of the mechanism of voltolization nor by any details which have been given merely for illustrative purposes but is limited only in and by the following claims in which it is intended to claim all novelty inherent in the invention.

We claim:

1. In an apparatus for subjecting liquid to the action of silent electric discharges, the improved means for distributing the liquid to be treated on to the surfaces of the electrodes which comprises a plurality of electrode plates disposed substantially vertically and parallel to each other, a trough disposed above the plates and adapted to be supplied with liquid and means associated with the trough for directing a stream of liquid in substantially equal amounts against each surface of the electrodes.

2. Apparatus according to claim 1 in which the trough has a plurality of slots in its bottom wall positioned to direct liquid flowing from the trough through the slots against the surfaces of each electrode.

3. Apparatus according to claim 1 in which the bottom wall of the trough comprises a plurality of substantially parallel rods extending lengthwise of the electrodes to form a slotted bottom wall, the slots of which are adapted to direct liquid flowing from the trough against the surfaces of each electrode.

4. Apparatus according to claim 1 in which one vertical wall of the trough is provided with means for raising or lowering the level of the liquid in the trough.

5. Apparatus according to claim 1 in which the vertical wall of the trough is provided with a slotted member adapted to be raised or lowered by means outside of the apparatus, thereby to raise or lower the level of the liquid maintained in the trough.

6. Apparatus according to claim 1 in which the trough is supported by means adapted to be raised or lowered by means outside the apparatus whereby the distance between the bottom of the trough and the top of the electrodes may be increased or decreased.

WILLIAM J. SWEENEY.
ROGER W. RICHARDSON.
EGER V. MURPHREE.